US006857742B2

(12) United States Patent
Shirayanagi et al.

(10) Patent No.: US 6,857,742 B2
(45) Date of Patent: Feb. 22, 2005

(54) MANUFACTURING METHOD AND SUPPLYING METHOD OF SPECTACLE LENSES

(75) Inventors: Moriyasu Shirayanagi, Saitama-ken (JP); Yoshimi Obara, Tokyo (JP)

(73) Assignee: PENTAX Corporation, Tokyo (JP)

( * ) Notice: Subject to any disclaimer, the term of this patent is extended or adjusted under 35 U.S.C. 154(b) by 317 days.

(21) Appl. No.: 09/895,386

(22) Filed: Jul. 2, 2001

(65) Prior Publication Data

US 2002/0039171 A1 Apr. 4, 2002

(30) Foreign Application Priority Data

Jul. 5, 2000 (JP) ........................................ 2000-203590

(51) Int. Cl.[7] .................................................. B02C 7/02
(52) U.S. Cl. ........................................ 351/177; 351/159
(58) Field of Search ................................ 351/177, 159, 351/176, 169

(56) References Cited

U.S. PATENT DOCUMENTS

| 3,434,781 | A | 3/1969 | Davis et al. |
| 3,960,442 | A | 6/1976 | Davis et al. |
| 5,050,979 | A | 9/1991 | Shinohara |
| 5,050,980 | A | 9/1991 | Shinohara |
| 5,137,344 | A | 8/1992 | Kagei |
| 5,353,072 | A | 10/1994 | Tejima et al. |
| 5,550,600 | A | 8/1996 | Ueno |
| 5,610,670 | A | 3/1997 | Ueno |
| 6,056,401 | A | 5/2000 | Shirayanagi |
| 6,089,710 | A | 7/2000 | Zeidler |
| 6,193,370 | B1 | 2/2001 | Shirayanagi |
| 6,419,549 | B2 * | 7/2002 | Shirayanagi ................... 451/5 |

| 2002/0018178 | A1 * | 2/2002 | Shirayanagi et al. ........ 351/177 |

FOREIGN PATENT DOCUMENTS

| EP | 0209917 | 1/1987 |
| EP | 0880046 | 11/1998 |
| FR | 2777668 | 10/1999 |
| GB | 2362347 | 11/2001 |
| JP | 10175149 | 6/1998 |

OTHER PUBLICATIONS

English Language Abstract of JP 10–175149.
"World's First Both–Sides Aspherical Single Focus Lens—Seiko Super Sovereign AZ", Optical Monthly Gankyo, General Technical Journal of Eyewear, Sep. 15, 1998, pp. 182–183.
English translation of "World's First Both–Sides Aspherical Single Focus Lens—Seiko Super Sovereign AZ", Optical Monthly Gankyo, General Technical Journal of Eyewear, Sep. 15, 1998, pp. 182–183.

* cited by examiner

Primary Examiner—Scott J. Sugarman
(74) Attorney, Agent, or Firm—Greenblum & Bernstein, P.L.C.

(57) ABSTRACT

Disclosed is a manufacturing method of a spectacle lens. The entire range of available vertex power of a spectacle lens is divided into a plurality of sections, and a plurality of types of semifinished lens blanks that are different in base curve are prepared for each of the sections. On the basis of required vertex power, choices of lens blanks are narrowed down. The plurality of types of the semifinished lens blanks can be selected for a specific vertex power. A customer selects one type of the semifinished lens blank based on weightings of optical performance and outward appearance. Further, a back surface of the selected semifinished lens blank is processed to form a finished lens according to a required specification for the spectacle lens.

13 Claims, 18 Drawing Sheets

FIG. 20A
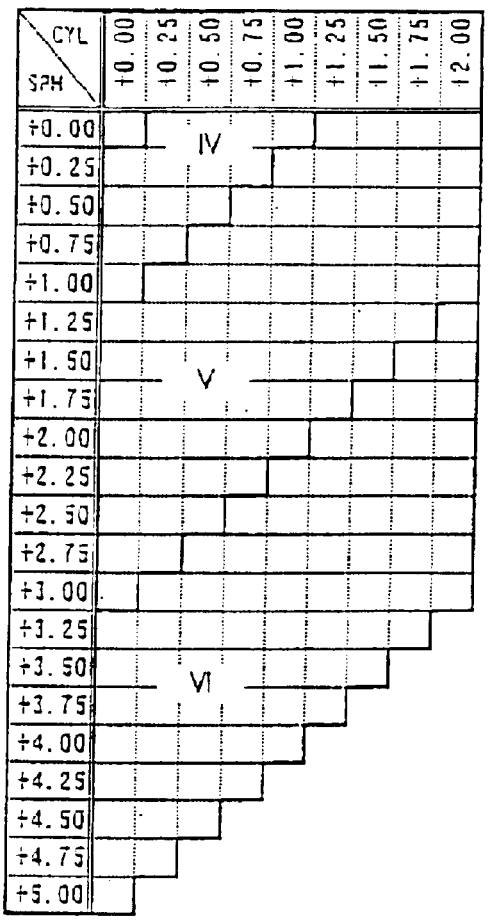
FIG. 20B
FIG. 20C
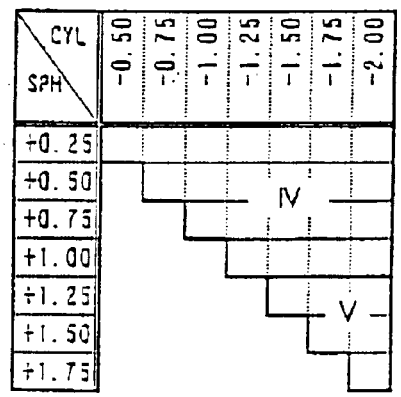

MANUFACTURING METHOD AND SUPPLYING METHOD OF SPECTACLE LENSES

BACKGROUND OF THE INVENTION

The present invention relates to a manufacturing method of a spectacle lens to correct eyesight.

In general, a spectacle lens Is custom-made to meet the customer's specification. However, it takes long time to process both front and back surf aces after receiving the customer's order. Therefore, semifinished lens blanks whose front surfaces are finished are stockpiled and a back surf ace of the selected semifinished lens blank is processed according to the customer's specification in order to shorten delivery times. Further, the entire range of available vertex power of a spectacle lens Is divided into about ten sections, and one type of the semifinished lens blank is prepared for each of the sections.

Aspherical spectacle lenses whose at least one of the front and back surfaces is aspherical have come into wide use. When the spectacle lens employs an aspherical surf ace, the base curve becomes slower (i.e., the absolute value of the front vertex power decreases) and the maximum thickness becomes shorter as compared with a spherical lens whose both of the front and back surfaces are spherical. A conventional semifinished lens blank prepared for an aspherical spectacle lens has an aspherical finished front surface. A back surface thereof will be processed to be spherical or toric to meet the customer's specification.

FIGS. 27A through 27C show a sample of the sections of the vertex power, FIG. 27A shows a range of minus diopter, FIG. 27B shows a range of plus diopter and FIG. 27C shows a range of mixed diopter. The entire range of the available vertex power, which is a combination of a spherical power SPH and a cylindrical power CYL, is divided into nine sections I through IX. One type of the semifinished lens blank is prepared for each of the sections. The relationship between the sections and the base curves of the semifinished lens blank is shown in TABLE 1 and FIG. 28.

TABLE 1

| Section | Base curve (D) |
| --- | --- |
| I | 0.50 |
| II | 1.25 |
| III | 2.00 |
| IV | 3.00 |
| V | 4.00 |
| VI | 5.00 |
| VII | 6.00 |
| VIII | 7.00 |
| IX | 8.00 |
| — | — |

Although the aspherical spectacle lens has advantages of slow base curve and thin maximum thickness, it has disadvantages of larger distortion at periphery and larger degradation of optical performance when the lens deviates from a regular position as compared with the spherical spectacle lens. In general, when the average power error and the astigmatism are well corrected, the slower the base curve is, the larger the distortion is. Namely, the optical performance in the periphery will be degraded as the base curve becomes slower to save weight. Since there Is an individual difference for a permissible distortion, one person may feel normal when he or she wears an aspherical spectacle lens having a slow base curve, while another person may feel abnormal and may not stand to wear the same aspherical spectacle lens.

In the conventional manufacturing method of the aspherical spectacle lens, the base curve is determined based on the vertex power alone without considerations of a problem of customer's taste such as weightings of optical performance and outward appearance, and a problem of customer's adaptability such as a permissible distortion. If the customer cannot be satisfied with the optical performance of the aspherical spectacle lens having the determined base curve, he or she has no other choice but to select a heavy spherical spectacle lens having a sharp base curve. Therefore, it is difficult to supply the most suitable spectacle lens for the customer with consideration of the customer's taste and adaptability.

Further, when the vertex powers of the right and left spectacle lenses belong to the different sections, the outward appearance lacks balance between the right and left lenses because of the difference between the base curves. On the other hand, when a finished lens having a predetermined vertex power belonging to the predetermined section is manufactured using a semifinished lens blank prepared for a different section in order to make the lenses the same outward appearance, the optical performance becomes significantly worse, because the each aspherical front surface of the semifinished lens blank is designed so as to keep an optical performance for the vertex power within the specific section.

SUMMARY OF THE INVENTION

It is therefore an object of the present invention to provide a manufacturing method, which is capable of manufacturing spectacle lenses with considering the customer's taste and adaptability Further, the present invention also aims to supply spectacle lenses that are balanced in an outward appearance while keeping the optical performance when the vertex powers of right and left lenses belong to the different sections.

For the above object, according to the manufacturing method of the present invention, a plurality of types of semifinished lens blanks that are different in the base curve are prepared for each of predetermined vertex powers. When the entire range of the vertex power is divided into a plurality of sections, the plurality of types of semifinished lens blanks are prepared for each of the sections. For instance, if there are nine sections and four types of semifinished lens blanks are prepared for each section, thirty-six types of semifinished lens blanks will be prepared.

On the basis of required vertex power, choices of lens blanks are narrowed down. The plurality of types, four types for example, of the semifinished lens blanks can be selected for a specific vertex power. A customer selects one type of the semifinished lens blank based on weightings of optical performance and outward appearance. Further, a back surface of the selected semifinished lens blank is processed to form a finished lens according to a required specification for the spectacle lens.

With this method, since a customer can select a favorite base curve with considering his or her taste and adaptability, a lens maker is able to supply a spectacle lens that is adapted to the customer's needs. Further, according to the invention, since the semifinished lens blanks whose base curves are approximately identical and vertex powers are different can be selected, it is able to make right and left lenses the approximately identical outward appearance while keeping the optical performance even when the vertex powers of right and left lenses are different to each other.

Three or more types of the semifinished lens blanks are preferably prepared for each of the predetermined vertex powers.

Further, any pair of the finished lenses, which are made from the semifinished lens blanks prepared for the same vertex power (i.e., for the same section if available), preferably satisfy the following condition (1) when SPH<0, CYL≦0 and satisfy the condition (2) when SPH>0, CYL≧0 in order to keep high optical performances (average power error and astigmatism) of the finished lenses made from any types of the semifinished lens blanks:

(1) $\Delta D1m(15)_i + \Delta D2m(15)_i > \Delta D1m(15)_j + \Delta D2m(15)_j$ (2) $\Delta D1m(15)_i + \Delta D2m(15)_i < \Delta D1m(15)_j + \Delta D2m(15)_j$ where SHP is a spherical power (unit: diopter), CYL is a cylindrical power (unit: diopter), D1m(h) and D2m(h) are surface powers of the front and back surfaces (unit: diopter) at the point whose distance from the optical axis of the finished lens is h (unit: mm) in a plane that contains the optical axis, $\Delta D1m(h)$ is a variation of surface power of the front surface and is obtained by D1m(h)−D1m(0), $\Delta D2m(h)$ is a variation of surface power of the back surface and is obtained by D2m(h)−D2m(0), and the subscript "i" represents the values of the finished lens that has smaller base curve and the subscript "j" represents the values of the finished lens that has larger baser curve as described by $D1m(0)_i < D1m(0)_j$.

The front surface of the finished lens may be a rotationally-symmetrical aspherical surface, an atoroidal surface, a spherical surface or a toric surface. The back surface may be also a rotationally-symmetrical aspherical surface, an atoroidal surface, a spherical surface or a toric surface. When one of the front and back surface is a spherical surface or a toric surface, the other surface must be a rotationally-symmetrical aspherical surface or an atoroidal surface. An atoroidal surface is defined that paraxial radii of curvatures in the cross-sections along orthogonal main meridians are different from each other and a cross-section is not a circular arc but a non-circular arc.

Further, it is preferable that average power errors and astigmatisms of the finished lenses, which are made from the semifinished lens blanks having different base curves prepared for the same vertex power, are approximately identical within 30 degrees of visual angle. Particularly, the differences of average power errors and differences of astigmatisms among the lenses may be not greater than 0.1 diopter (D) within 30 degrees of visual angle.

Still further, it is preferable that one type of the semifinished lens blanks prepared for one vertex power has an approximately identical base curve with one type of the semifinished lens blanks prepared for another vertex power. Particularly, the differences of the vertex powers may be not greater than 0.2 diopter.

According to another definition, the manufacturing method of the present invention includes dividing the entire range of available vertex power of a spectacle lens into a plurality of sections, preparing a plurality of types of semifinished lens blanks that are different in base curve for each of the sections, determining one of the sections according to a required specification of the spectacle lens, selecting one type of the semifinished lens blank among the plurality of types of the semifinished lens blanks that are prepared for the same sections based on weights of optical performance and of outward appearance, and processing a back surface of the selected semifinished lens blank to form a finished lens according to a required specification for the spectacle lens.

DESCRIPTION OF THE ACCOMPANYING DRAWINGS

FIGS. 20A, 20B and 20C show the sections of the base curve for semifinished lens blanks according to the third embodiment:

FIGS. 27A, 27B and 27C show the sections of the base curve for semifinished lens blanks according to the prior art.

DESCRIPTION OF THE EMBODIMENTS

A manufacturing method of a spectacle lens embodying the invention will be described with reference to the accompanying drawings. First, the outline of the invention is described with reference to FIGS. 1A and 1B, and then design examples (embodiments) will be described.

Figure 1A:
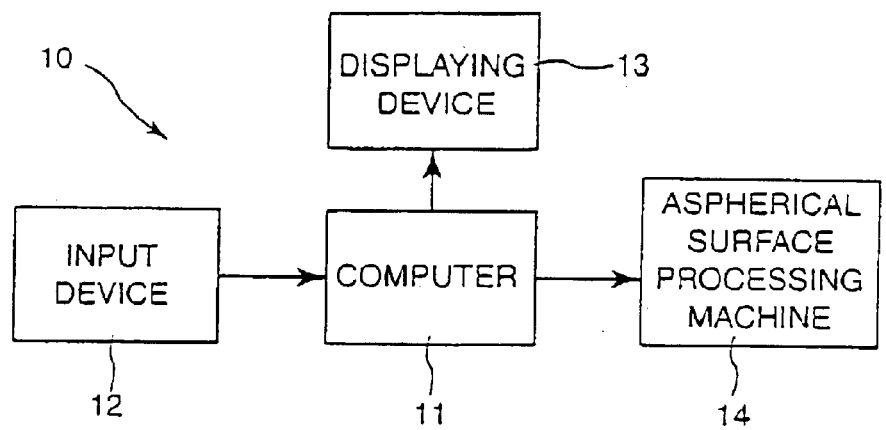
FIG. 1A is a block diagram showing a manufacturing system of a spectacle lens embodying the invention.
Figure 1B:
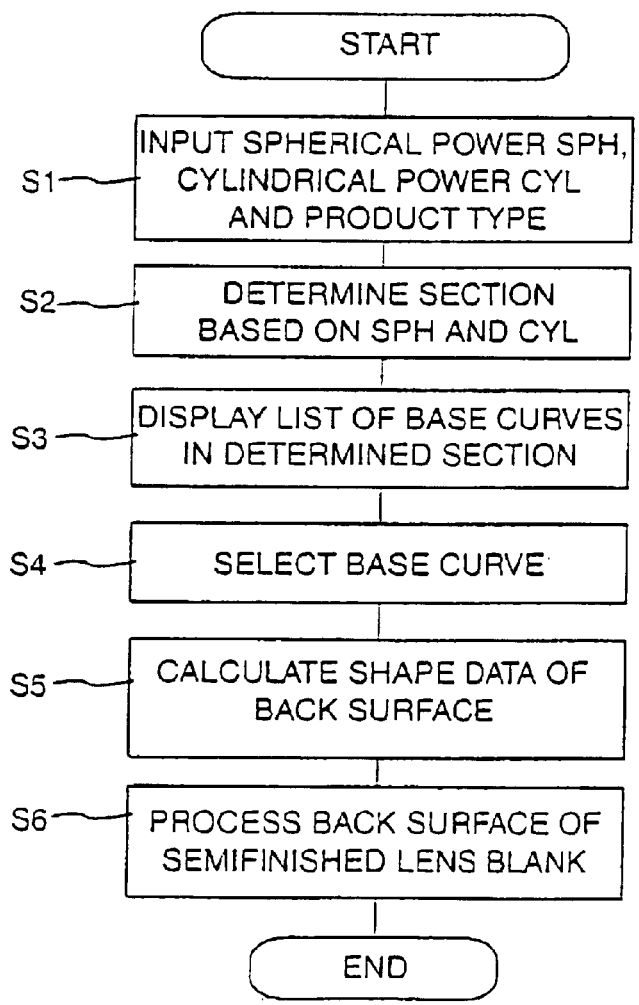
FIG. 1B is a flowchart showing a manufacturing method of a spectacle lens embodying the invention.

FIG. 1A is a block diagram showing the manufacturing system of a spectacle lens and FIG. 1B is a flowchart showing the manufacturing method embodying the invention.

As shown in FIG. 1A, the manufacturing system 10 of spectacle lenses is provided with a computer 11 on which a computer program discussed later is installed, an input device 12 such as a keyboard to input data to the computer 11, a display 13 such as CRT that is connected to the computer 11, and an aspherical surface processing machine 14 that is controlled by the computer 11.

When an order from a customer is received, a spectacle lens is manufactured in a manufacturing factory according to steps of FIG. 1B. In step S1, an operator input customer's data (i.e., specifications of the required spectacle lens) to the computer 11 with the input device 12. The specifications include a vertex power (a spherical power SPH and a cylindrical power CYL) and a product type that determines the refractive index of the lens material. The customer's data may be input to a terminal computer placed in an opticianry. In such a case, the customer's data is transmitted to the factory through a computer network.

Figures 27A, 27B, 27C:
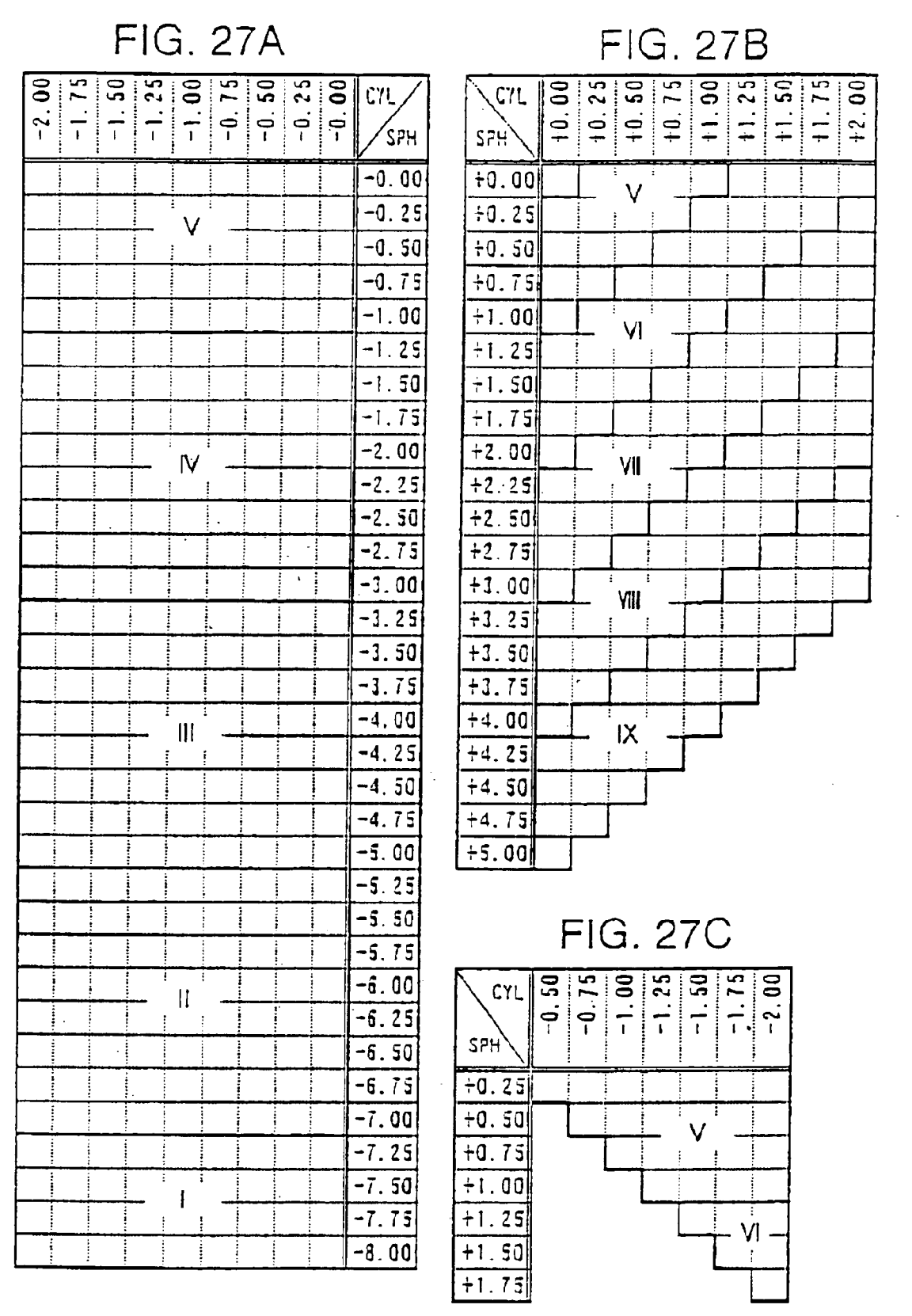

In step S2, the computer 11 determines a section of the vertex power based on the spherical power SPH and the cylindrical power CYL. The entire range of available vertex power of a spectacle lens is divided into nine sections I through IX as shown in FIGS. 27A through 27C. A plurality of types of semifinished lens blanks that are different in base curve are prepared for each section In the following embodiments, three or four types of semifinished lens blanks are prepared.

In step S3, the computer 11 lists up the base curves that are prepared for the determined section on the display 13.

It is not absolutely necessary to divide the vertex powers into the sections for the invention. A plurality of types of semifinished lens blanks having different base curves may be prepared for each vertex power without defining the sections.

As described above, the weight of the spectacle lens becomes small as the base curve becomes slower, while the optical performance in the periphery is degraded. In step S4, the most suitable base curve is selected with weighting the optical performance and the outward appearance in considerations of customer's taste and adaptability. If a customer requires a lightweight spectacle lens with performance penalty, the slowest base curve should be selected. On the contrary, when a customer places emphasis on the optical performance rather than lightening the weight, the sharpest base curve should be selected.

After the base curve is selected, the computer 11 calculates the shape data of the back surface based on the selected base curve and the specification according to a calculating program in step S5. The calculating program finds the shape data of the back surface based on the selected base curve as a precondition with an optimization algorithm such as a damping least squares method so as to optimize the optical performance while keeping the required vertex power.

Next, the operator places the semifinished lens blank having selected base curve on the aspherical surf ace processing machine 14. After the placement, when the operator enters a start command from the input device 12, the computer 11 controls the aspherical surface processing machine 14 to process (grind) the back surface of the semifinished Lens blank based on the shape data found in step S5.

Next, three embodiments of the series of semifinished lens blanks employed in the manufacturing method of the invention and the series of finished lenses will be described.
First Embodiment In a first embodiment, a refractive index of the lens material is 1.6, a diameter of the finished lens is Φ70 mm, the minimum thickness (the center thickness for a minus lens and the edge thickness for a plus lens) is 1.0 mm, the front surf ace is a rotationally-symmetrical aspherical surface and a back surf ace is processed to be a spherical surf ace or a toric surface. Further, the entire range of the available vertex power of a spectacle lens is divided into nine sections I through IX in the same manner as the prior art shown in FIGS. 27A, 27B and 27C. Four types of semifinished lens blanks that are different in base curve are prepared for each section. Therefore, thirty-six types of semifinished lens blanks are prepared. In the following description, the unit "diopter" is indicated by "D".

Figure 2:
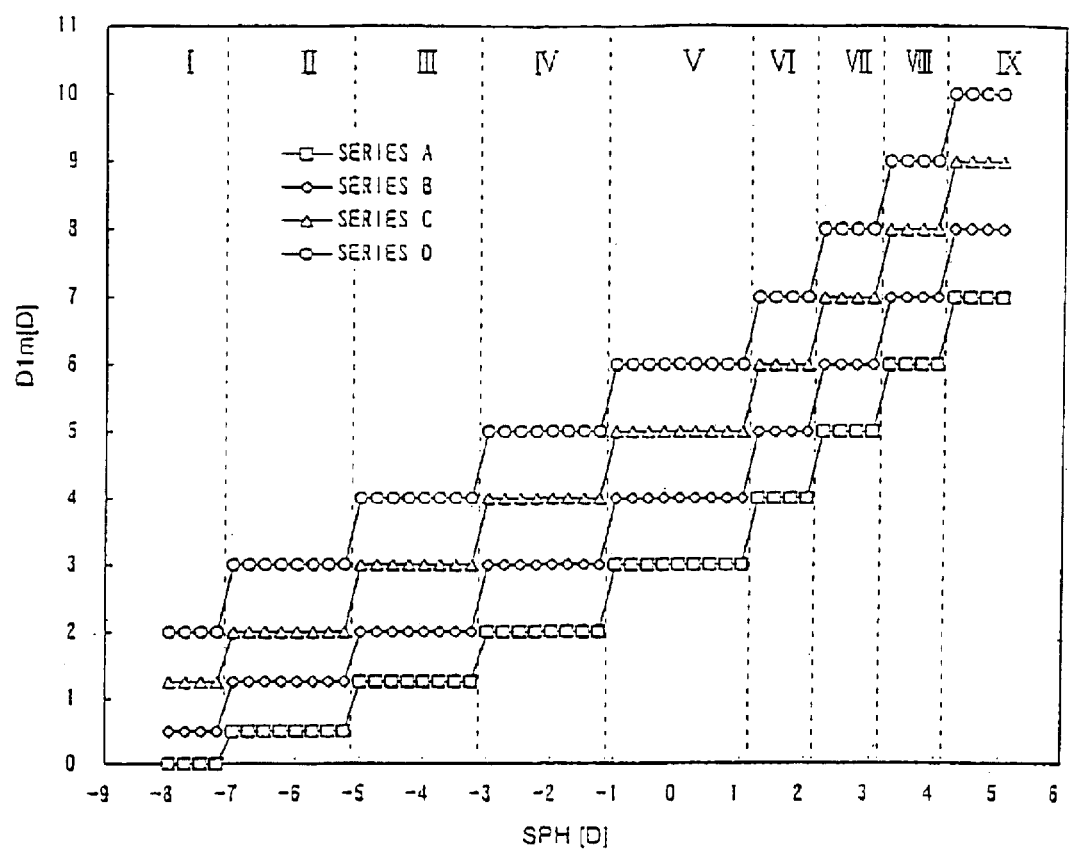
FIG. 2 is a graph showing variations of base curves of four series of the semifinished lens blanks according to a first embodiment.

FIG. 2 is a graph showing variations of base curves of the semifinished lens blanks according to the first embodiment. A group of the semifinished lens blanks whose base curves are slowest in every section is referred to as a "series A". A second group of the lens blanks whose base curves are slowest but one is referred to as a "series B", and a third group is referred to as a "series C". A group of the lens blanks whose base curves are sharpest is referred to as a "series D". The following TABLE 2 shows numerical values of the base curve of the semifinished lens blanks of the series A–D. For instance, in the section II (SPH −5.25 D to −7.00 D, CYL 0.00 D to −2.00 D), the base curves of the series A, B, C and D are 0.50 D, 1.25 D, 2.00 D and 3.00 D, respectively.

TABLE 2

| | Base Curve (unit: D) | | | |
|---|---|---|---|---|
| Section | Series A | Series B | Series C | Series C |
| I | 0.00 | 0.50 | 1.25 | 2.00 |
| II | 0.50 | 1.25 | 2.00 | 3.00 |
| III | 1.25 | 2.00 | 3.00 | 4.00 |
| IV | 2.00 | 3.00 | 4.00 | 5.00 |
| V | 3.00 | 4.00 | 5.00 | 6.00 |
| VI | 4.00 | 5.00 | 6.00 | 7.00 |
| VII | 5.00 | 6.00 | 7.00 | 8.00 |
| VIII | 6.00 | 7.00 | 8.00 | 9.00 |
| IX | 7.00 | 8.00 | 9.00 | 10.00 |

In any sections, the most lightweight and thinnest spectacle lens can be obtained by employing the semifinished lens blank of the series A, and the spectacle lens having the best optical performance can be obtained by employing the semifinished lens blank of the series D. The spectacle lens made from the semifinished lens blank of the series B or C has middle weight and middle optical performance. Between the series B and C, if the customer assigns weight to the advantage of lightweight, the series B should be selected, else if the customer assigns weight to the optical performance, the series C should be selected.

Further, in the first embodiment, the base curve of the series D in each section is equal to that of the series C in the upper section whose Roman numeral is larger (the right hand side in FIG. 2). In the same manner, the base curves of the series C and B are equal to that of the series B and A in the upper sections, respectively. Such a setting of the base curves is advantageous to balance the outward appearances of the right and left lenses whose required vertex powers belong to the different sections. For instance, assuming that the required vertex powers of right and left lenses are SPH −6.00 D and SPH −2.00 D, respectively, the semifinished lens blank of the series D in the section II should be selected to make the right lens and the semifinished lens blank of the series B in the section IV should be selected to make the left lens in order to make the lenses the same outward appearance. For such a balancing, the base curve of the specific series in the specific section is preferably identical with the base curve of the corresponding series in the corresponding section. When the difference between the base curves is not greater than 0.2 diopter, the difference in the outward appearance presents no substantial problem.

Next, the shape of the aspherical surfaces of the finished lenses made from the semifinished lens blanks of various series in various sections will be described.

Any pair of the finished lenses according to the first embodiment, which are made from the semifinished lens blanks prepared for the same section, satisfy the following condition (1) when SPH<0, CYL≦0 and satisfy the condition (2) when SPH>0, CYL≧0:

(1) $\Delta D1m(15)_i + \Delta D2m(15)_i > \Delta D1m(15)_j + \Delta D2m(15)_j$ (2) $\Delta D1m(15)_i + \Delta D2m(15)_i < \Delta D1m(15)_j + \Delta D2m(15)_j$ where SHP is a spherical power, CYL is a cylindrical power, $D1m(h)$ and $D2m(h)$ are surface powers of the front and back surfaces at the point whose distance from the optical axis of the finished lens is h (unit: mm) in a plane that contains the optical axis, $\Delta D1m(h)$ is a variation of surface power of the front surface and is obtained by $D1m(h)-D1m(0)$, $\Delta D2m(h)$ is a variation of surface power of the back surface and is obtained by $D2m(h)-D2m(0)$, and the subscript "i" represents the values of the finished lens that has smaller base curve and the subscript "j" represents the values of the finished lens that has larger baser curve as described by $D1m(0)_i < D1m(0)_j$.

When the condition (1) or (2) is satisfied, the optical performances (average power error and astigmatism) of the finished lenses made from any type of the semifinished lens blanks can be kept high.

Figure 3:
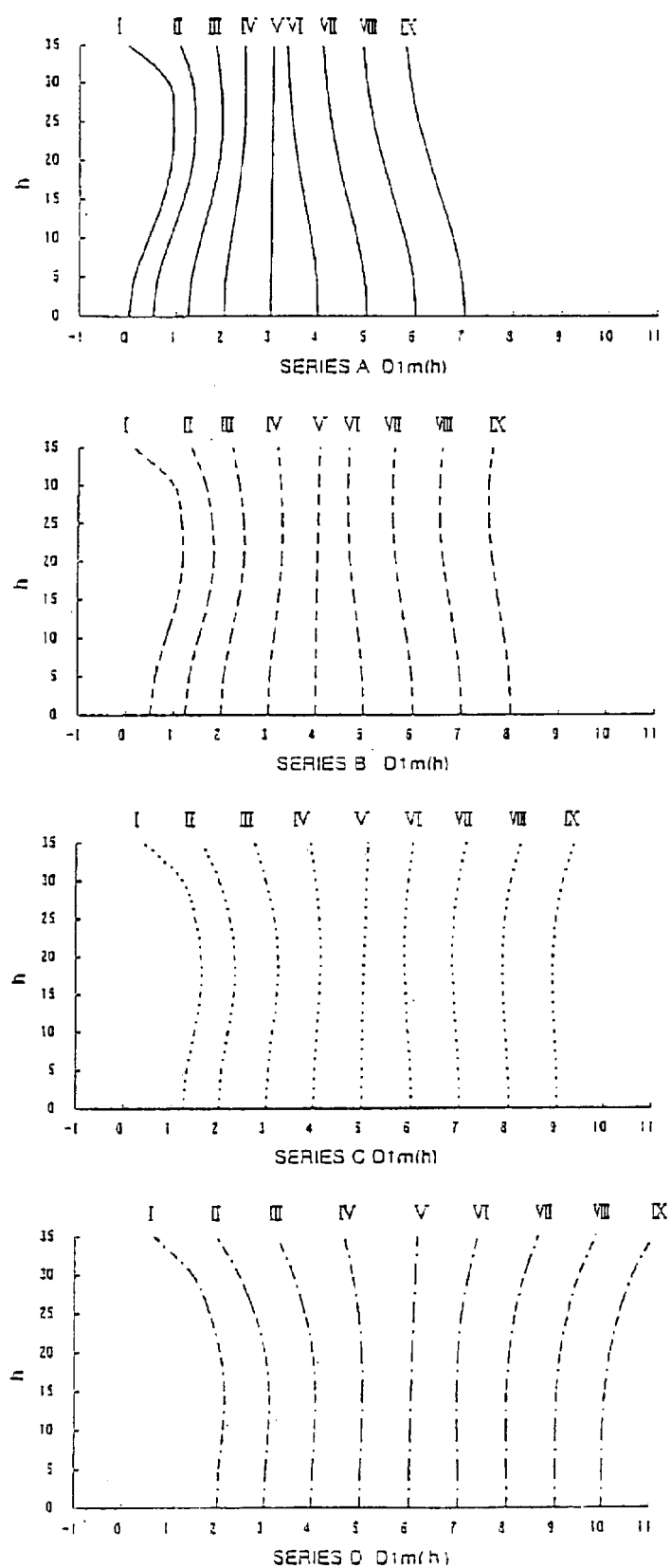
FIG. 3 shows graphs of front surface powers D1m(h) of four series of the semifinished lens blanks according to a first embodiment in cross-section containing the optical axis, each graph shows D1m(h) of lens blanks of nine sections.
Figure 4:
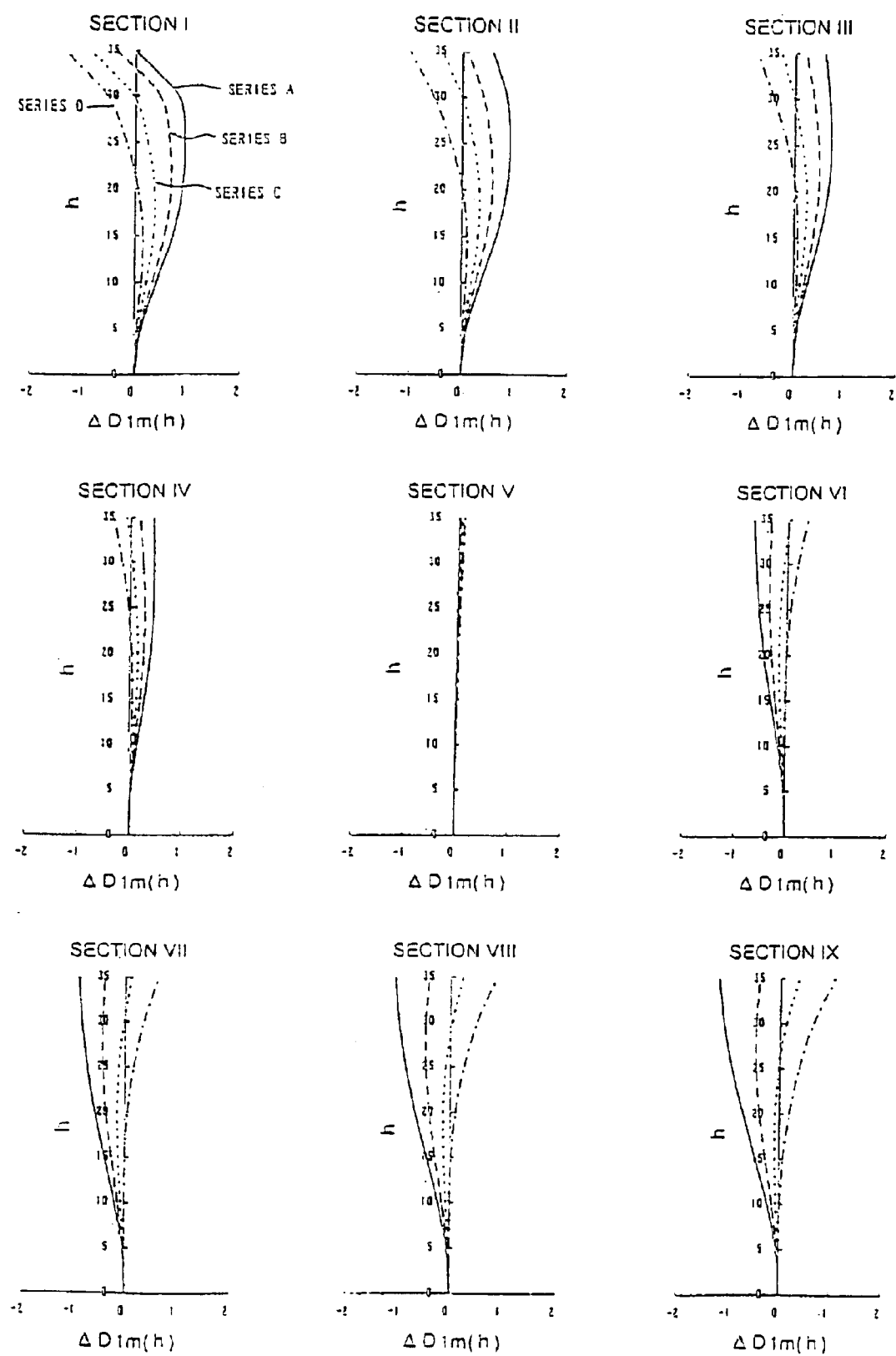
FIG. 4 shows graphs of variations of front surface powers $\Delta D1m(h)$ of the semifinished lens blanks of the nine sections according to the first embodiment, each graph shows $\Delta D1m(h)$ of the four series of lens blanks.

The front surface powers $D1m(h)$ of the semifinished lens blanks of various series in various sections in the cross-section containing the optical axis are shown in graphs in FIG. 3. Further, FIG. 4 shows graphs of variations of front surface powers $\Delta D1m(h)$ of the semifinished lens blanks of the nine sections. Since the back surface is spherical or toric, $\Delta D2m(h)$ equals 0 in spite of the height h. With reference to FIG. 4, $\Delta D1m(15)_i > \Delta D1m(15)_j$ holds for $D1m(0)_i < D1m(0)_j$ in the minus lens (sections I, II, III and IV), $\Delta D1m(15)_i < \Delta D1m(15)_j$ holds for $D1m(0)_i < D1m(0)_j$ in the plus lens (sections VI, VII, VIII and IX). That is, the conditions (1) and (2) are satisfied in either case.

Figure 5:
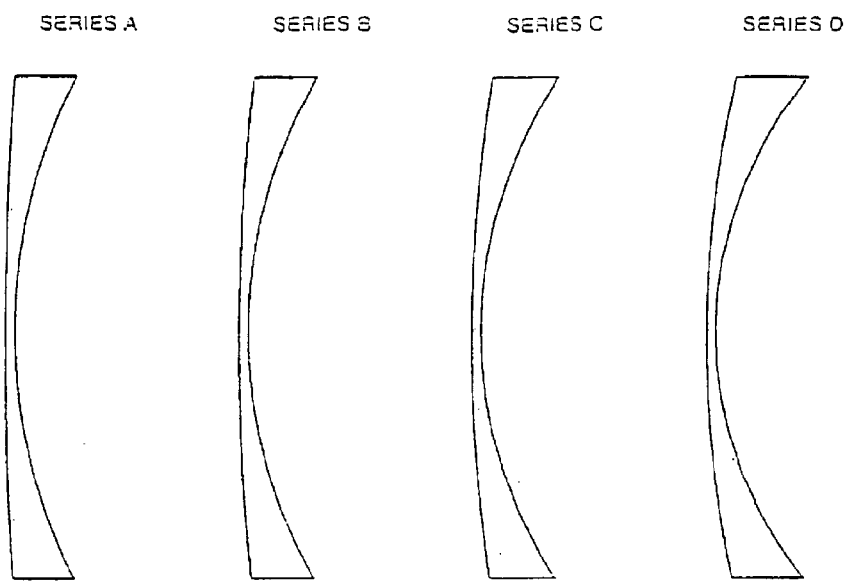
FIG. 5 shows cross-sections of the finished lenses (SPH −6.00 D) made from the four series of semifinished lens blanks of the first embodiment.

FIG. 5 shows cross-sections of the finished lenses (SPH −6.00 D) made from the semifinished lens blanks of the series A, B, C and D in the section II. The shapes of the finished lenses are different from one another. The slower the base curve is, the thinner the edge thickness is and the shorter the jutting amount of the front surface is. The finished lens made form the semifinished lens blank of the series A is the lightest in weight. The lens made from the series B is heavier than the series A, and the lens made from the series C is heavier than the series B. The finished lens made from the semifinished lens blank of the series D is the heaviest in weight.

Figure 6:
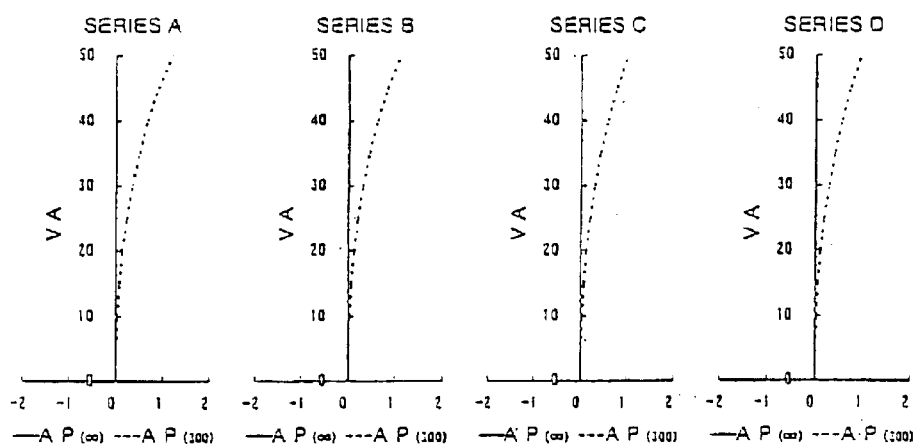
FIG. 6 shows graphs of average power errors AP of the finished lenses of FIG. 5.
Figure 7:
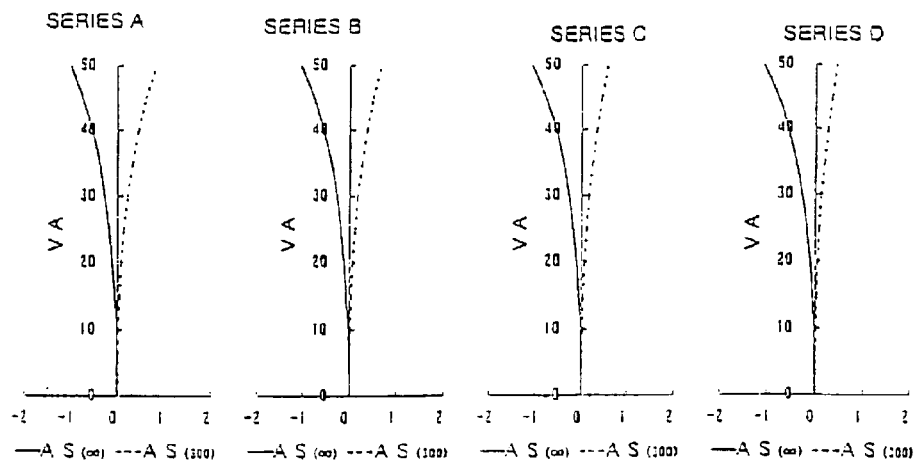
FIG. 7 shows graphs of astigmatisms AS of the finished lenses of FIG. 5.

Average power errors AP of these finished lenses with respect to the visual angle VA are shown by graphs in FIG. 6 and astigmatisms AS thereof are shown by graphs in FIG. 7. In each graph a solid line represents the aberration for distance vision (object distance: ∞) and a dotted line represents the aberration for near vision (object distance: 300 mm).

It is preferable that the average power errors AP and astigmatisms AS of the finished lenses, which are made from the semifinished lens blanks having different base curves prepared for the same vertex power, are approximately identical within 30 degrees of visual angle. The differences of average power errors and differences of astigmatisms among the lenses may be not greater than 0.1 diopter within 30 degrees of visual angle.

In the first embodiment, since the variations of the front surface power $\Delta D1m(h)$ are different according to the series as shown in FIG. 4, the optical performance (the average power error and the astigmatism) of the finished lens becomes substantially constant when the finished lens is made from any one of the semifinished lens blanks of the series A, B, C and D. For the vertex power SPH −6.00 D both of the differences of the average power errors AP and the differences of the astigmatisms AS are not greater than 0.1 diopter within 30 degrees of visual angle as shown in FIGS. 6 and 7. That is, the optical performances are approximately identical In spite of the difference in the series.

On the other hand, distortions at 50 degrees of visual angle are −37.0 in the series A, −35.1% in the series B, −33.2% in the series C and −31.1% in the series D. The distortion decreases as the base curve becomes sharper. Further, sensitivities $\Delta AP(30°)/\Delta Y$ of the variation of the average power error at 30 degrees of visual angle with respect to the lens deviation in upward direction are −0.089 D/mm in the series A, −0.078 D/mm in the series B, −0.068 D/mm in the series C and −0.054 D/mm in the series D. Still further, sensitivities ΔAS(30°)/ΔY of the variation of the astigmatism at 30 degrees of visual angle with respect to the lens deviation in upward direction are −0.099 D/mm in the series A, −0.088 D/mm in the series B, −0.077 D/mm in the series C and −0.063 D/mm in the series D. The sensitivity decreases as the base curve becomes sharper.

Figure 8:
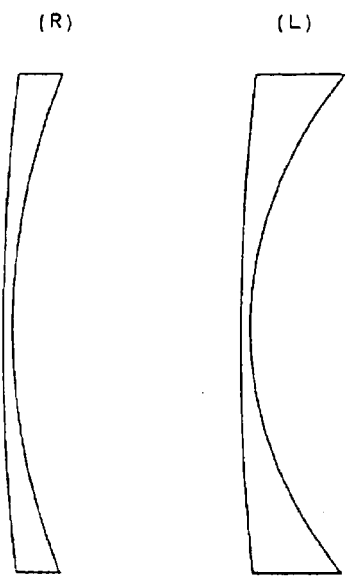
FIG. 8 shows cross-sections of right and left finished lenses made from the semifinished lens blanks of the first embodiment to balance in outward appearance.
Figure 9:
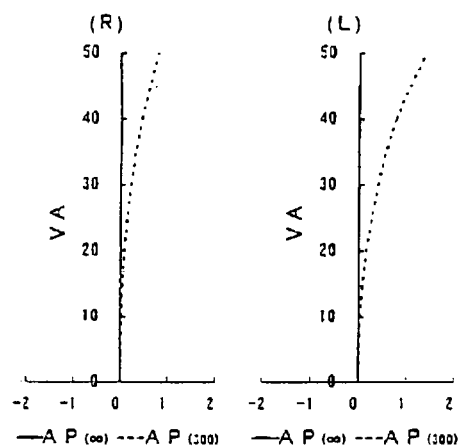
FIG. 9 shows graphs of average power errors AP of the finished lenses of FIG. 8.
Figure 10:
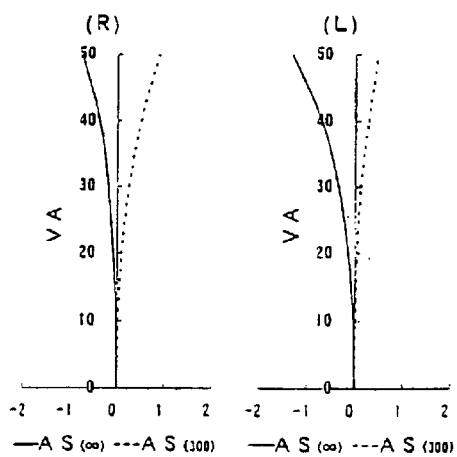
FIG. 10 shows graphs of astigmatism AS of the finished lenses of FIG. 8.

When the required vertex powers of right and left lenses belong to the different sections, for example, when the required vertex power of the right lens is SPH −4.00 D and that of the left lens is SPH −8.00 D, the semifinished lens blank of the series C in the section I (base curve 1.25 D) selected to make the right lens and the semifinished lens blank of the series A in the section III (base curve 1.25 D) is selected to make the left lens. FIG. 8 shows cross-sections of a right finished lens (R) and a left finished lens (L), and FIGS. 9 and 10 show the average power error AP and the astigmatism AS of the finished lenses, respectively. According to the first embodiment, the finished lenses are balanced not only in the outward appearance as shown in FIG. 8 but also in the optical performance as shown in FIGS. 9 and 10.

Second Embodiment

In a second embodiment, a refractive index of the lens material is 1.6, a diameter of the finished lens is Φ70 mm, the minimum thickness is 1.0 mm, the front surface in a spherical surface and the back surface is a rotationally-symmetrical aspherical surface or an atoroidal surface. Further, the relationship between the vertex power and the sections is the same as the prior art shown in FIGS. 27A, 27B and 27C. Four series A, B, C and D of semifinished lens blanks that are different in base curve are prepared in the same manner as the first embodiment.

The spherical base curves of the four series A, B, C and D are assigned to the front surfaces, and the shapes of the back surfaces are determined so as to have the most suitable optical performance with the combination of the shapes of the front surfaces.

Figure 11:
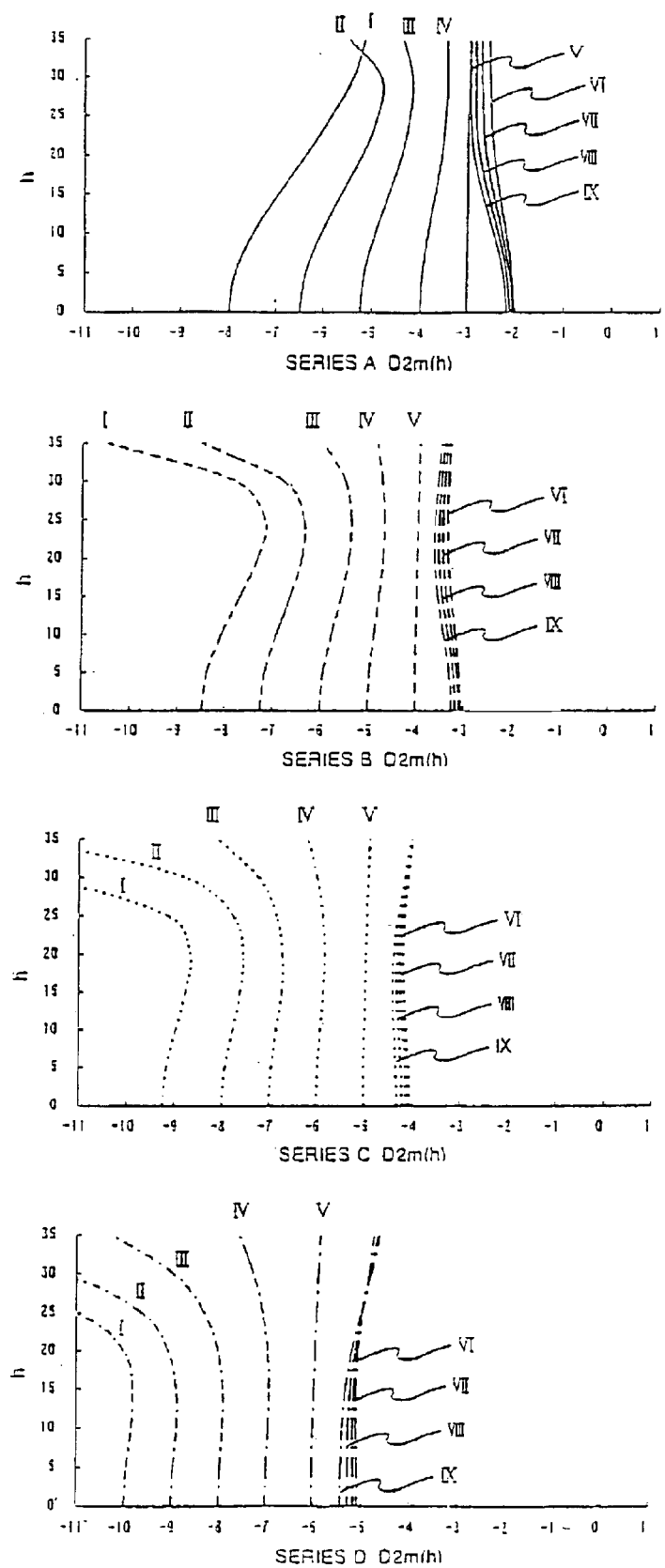
FIG. 11 shows graphs of back surface powers D2m(h) of finished lenses made from four series of the semifinished lens blanks according to a second embodiment in cross-section containing the optical axis, each graph shows D2m(h) of the finished lenses of nine sections.

FIG. 11 shows graphs of back surface powers D2m(h) of finished lenses made from the semifinished lens blanks in cross-section containing the optical axis. Each graph shows D2m(h) of the finished lenses of the nine sections of the specific series. There are finished lenses whose vertex powers are SPH −8.00 D in the section I, SPH −6.00 D in the section II, SPH −4.00 D in the section III, SPH −2.00 D in the section IV, SPH 0.00 D in the section V, SPH +2.00 D in the section IV, SPH +3.00 D in the section VII, SPH +4.00 D in the section VIII and SPH +5.00 in the section IX.

Figure 12:
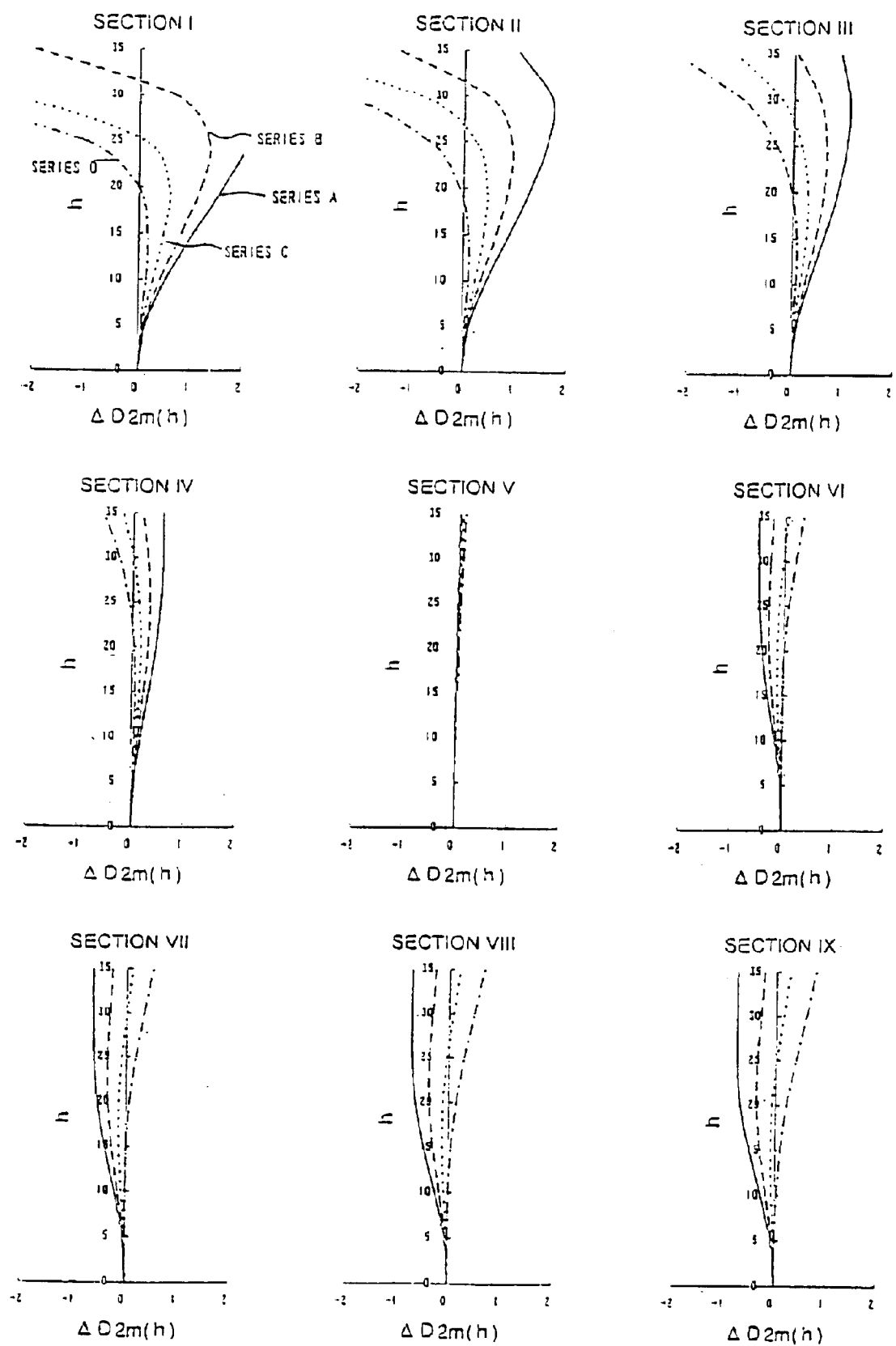
FIG. 12 shows graphs of Variations of back surface powers $\Delta D2m(h)$ of the finished lenses of the nine sections according to the second embodiment, each graph shows $\Delta D2m(h)$ of the finished lens made from four series of lens blanks.

FIG. 12 shows graphs of variations of back surface powers ΔD2m(h) of the finished lenses of the nine sections. Each graph shows ΔD2m(h) of the finished lenses made from four series of lens blanks. Since the front surface is spherical, ΔD1m(h) equals 0 in spite of the height h. With reference to FIG. 12, $\Delta D2m(15)_i > \Delta D2m(15)_j$ holds for $D1m(0)_i < D1m(0)_j$ in the minus lens (sections I, II, III and IV), $\Delta D2m(15)_i < \Delta D2m(15)_j$ holds for $D1m(0)_i < D1m(0)_j$ in the plus leas (sections VI, VII, VIII and IX). That is, the conditions (1) and (2) are satisfied in either case.

Figure 13:
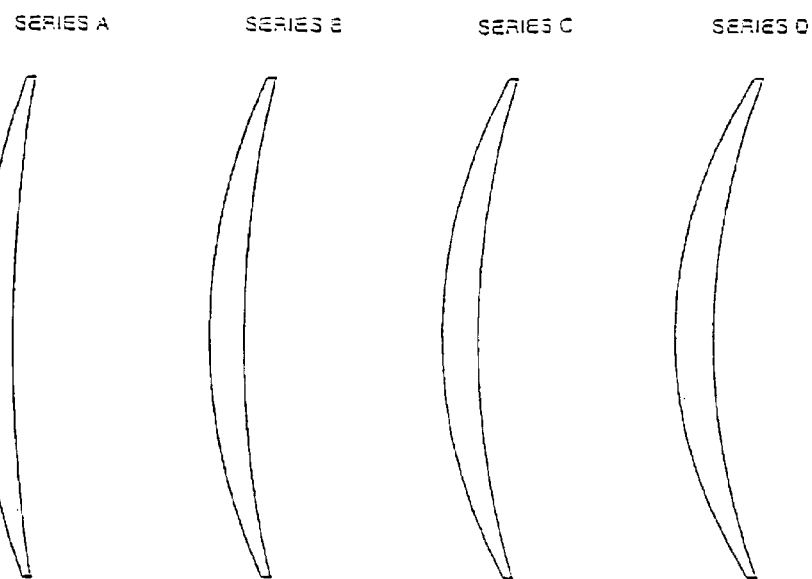
FIG. 13 shows cross-sections of the finished lenses (SPH +3.00 D) made from the four series of semifinished lens blanks of the second embodiment.

FIG. 13 shows cross-sections of the finished lenses (SPH +3.00 D) made from the semifinished lens blanks of the series A, B, C and D in the section VII. The shapes of the finished lenses are different from one another. The slower the base curve is, the thinner the center thickness is. The finished lens made form the semifinished lens blank of the series A is the lightest in weight. The lens made from the series B is heavier than the series A, and the lens made from the series C is heavier than the series B. The finished lens made from the semifinished lens blank of the series D is the heaviest in weight.

Figure 14:
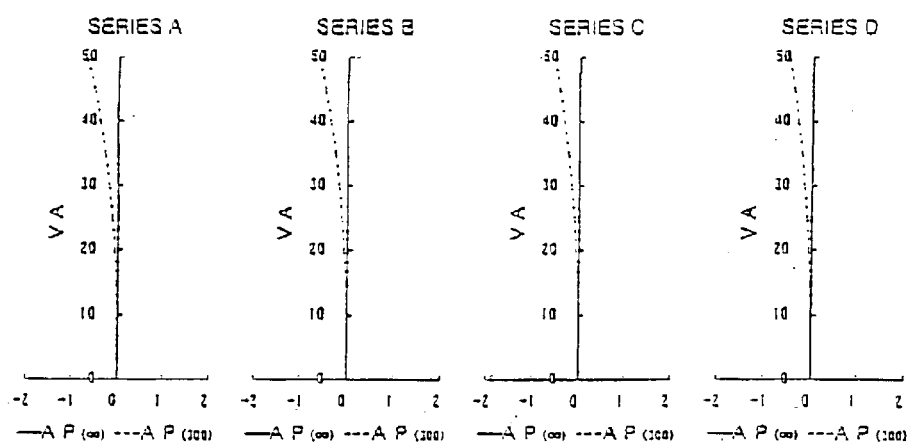
FIG. 14 shows graphs of average power errors AP of the finished lenses of FIG. 13.
Figure 15:
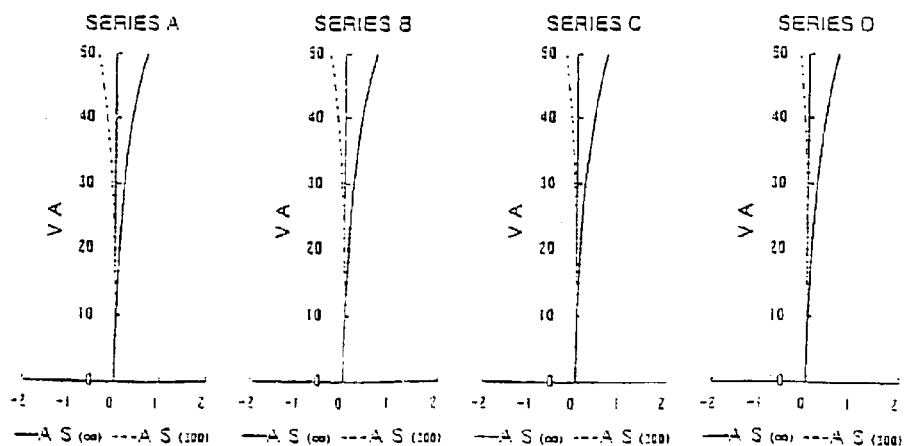
FIG. 15 shows graphs of astigmatisms AS of the finished lenses of FIG. 13.

Average power errors AP of these finished lenses with respect to the visual angle VA are shown by graphs in FIG. 14 and astigmatisms AS thereof are shown by graphs in FIG. 15. In each graph a solid line represents the aberration for distance vision (object distance: ∞) and a dotted line represents the aberration for near vision (object distance: 300 mm).

In the second embodiment, since the variations of the back surface power ΔD2m(h) are different according to the series as shown in FIG. 12, the optical performance (the average power error and the astigmatism) of the finished lens becomes substantially constant when the finished lens is made from any one of the semifinished lens blares of the series A, B, C and D. For the vertex power SPH +3.00 both of the differences of the average power errors AP and the differences of the astigmatisms AS are not greater than 0.05 diopter within 30 degrees of visual angle as shown in FIGS. 14 and 15. That is, the optical performances are approximately identical in spite of the difference in the series.

On the other hand, distortions at 50 degrees of visual angle are +14.7% in the series A, +14.3% in the series B, +14.0% in the series C and +13.7% in the series D. The distortion decreases as the base curve becomes sharper. Further, sensitivities ΔAP(30°)/ΔY of the variation of the average power error at 30 degrees of visual angle with respect to the lens deviation in the upward direction are +0.056 D/mm in the series A, +0.046 D/mm in the series B, +0.036 D/mm in the series C and +0.026 D/mm in the series D. Still further, sensitivities ΔAS (30°)/ΔY of the variation of the astigmatism at 30 degrees of visual angle with respect to the lens deviation in the upward direction are +0.055 D/mm in the series A, +0.045 D/mm in the series B, +0.034 D/mm in the series C and +0.024 D/mm in the series D. The sensitivity decreases as the base curve becomes sharper.

Figure 16:
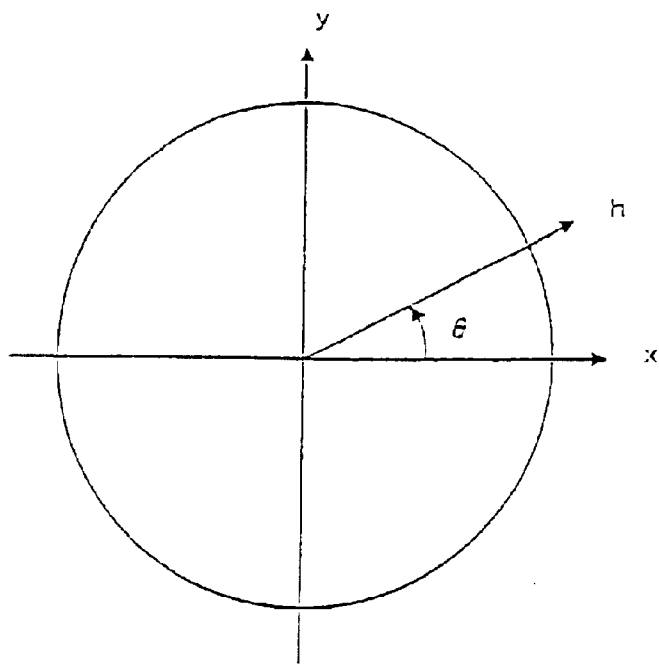
FIG. 16 is a schematic view showing azimuth angle θ in a plane perpendicular to the optical axis.

When the specification of the spectacle lens includes a cylindrical power CYL, the back surface Is processed to be an atoroidal surface, and the variation of the back surface power ΔD2m(h) varies depending on the orientation of the cross-section. The orientation of the cross-section that contains the optical axis is defined as azimuth angle θ in an x-y plane perpendicular to the optical axis as shown in FIG. 16. The azimuth angle θ is an amount of rotation in counterclockwise direction with respect to the horizontal x-axis.

Figure 18:
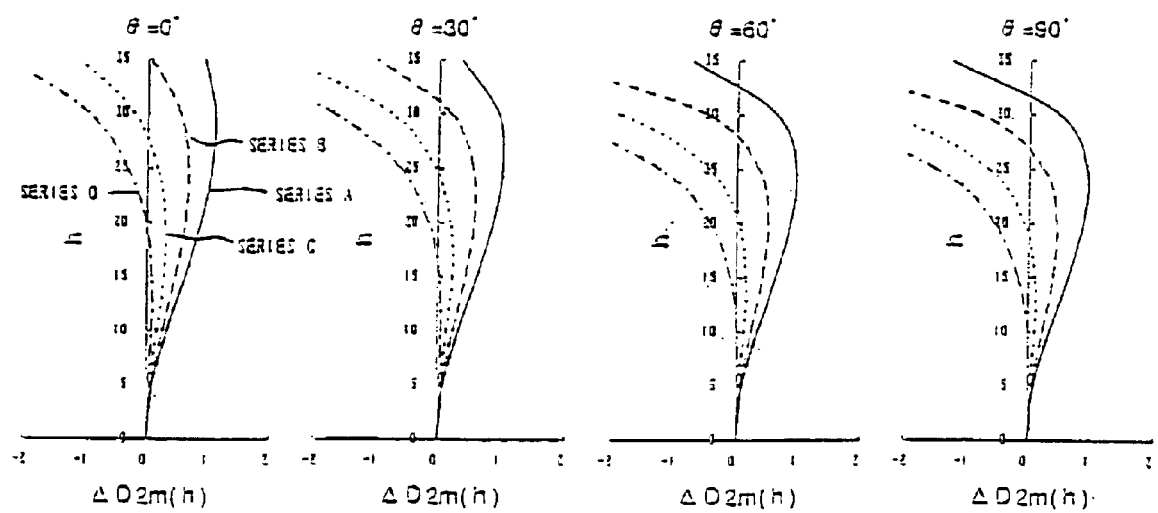
FIG. 18 shows graphs of variation of back surface powers $\Delta D2m(h)$ of the finished lenses of FIG. 17 in the four different cross-sections.
Figure 17:
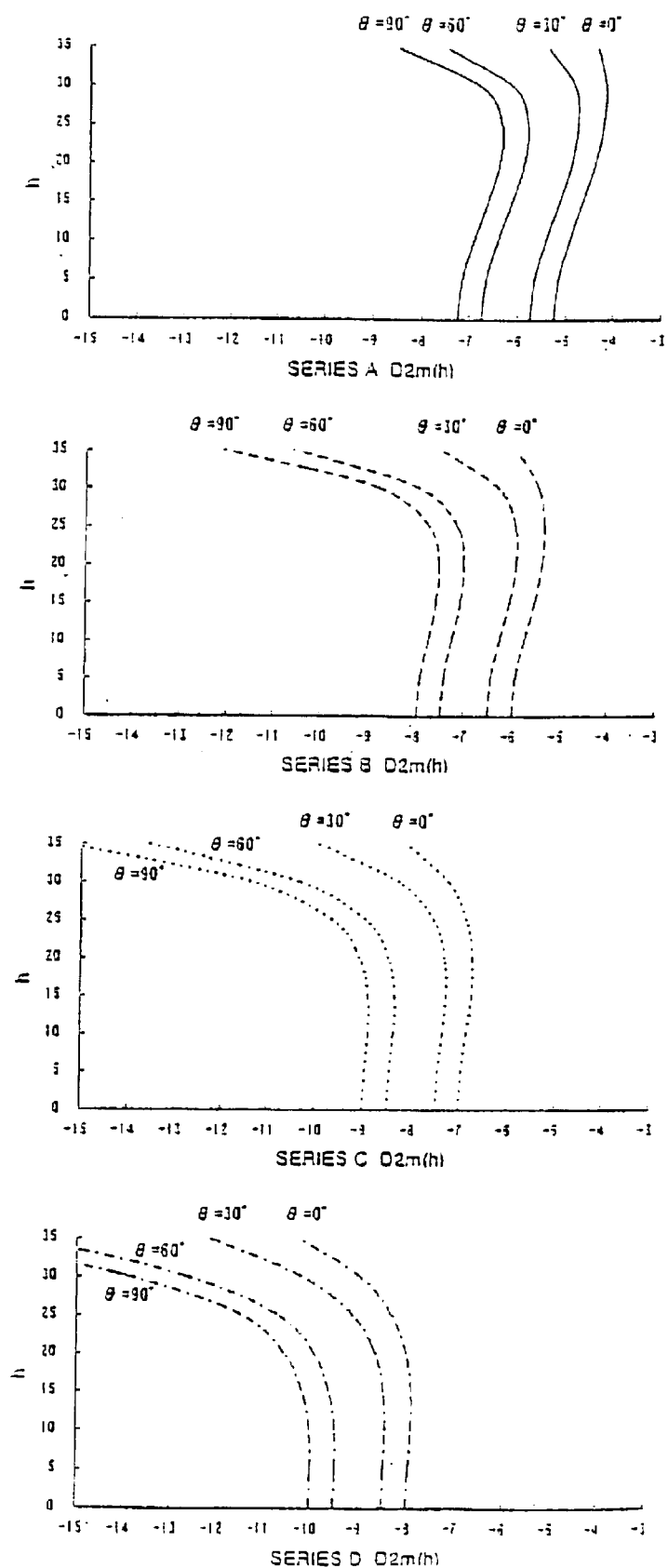
FIG. 17 shows graphs of back surface powers D2m(h) of finished lenses (SPH −4.00 D, CYL −2.00 D, AX 180 degrees) made from four series of semifinished lens blanks of the second embodiment in four different cross-sections containing the optical axis.
Figure 19:
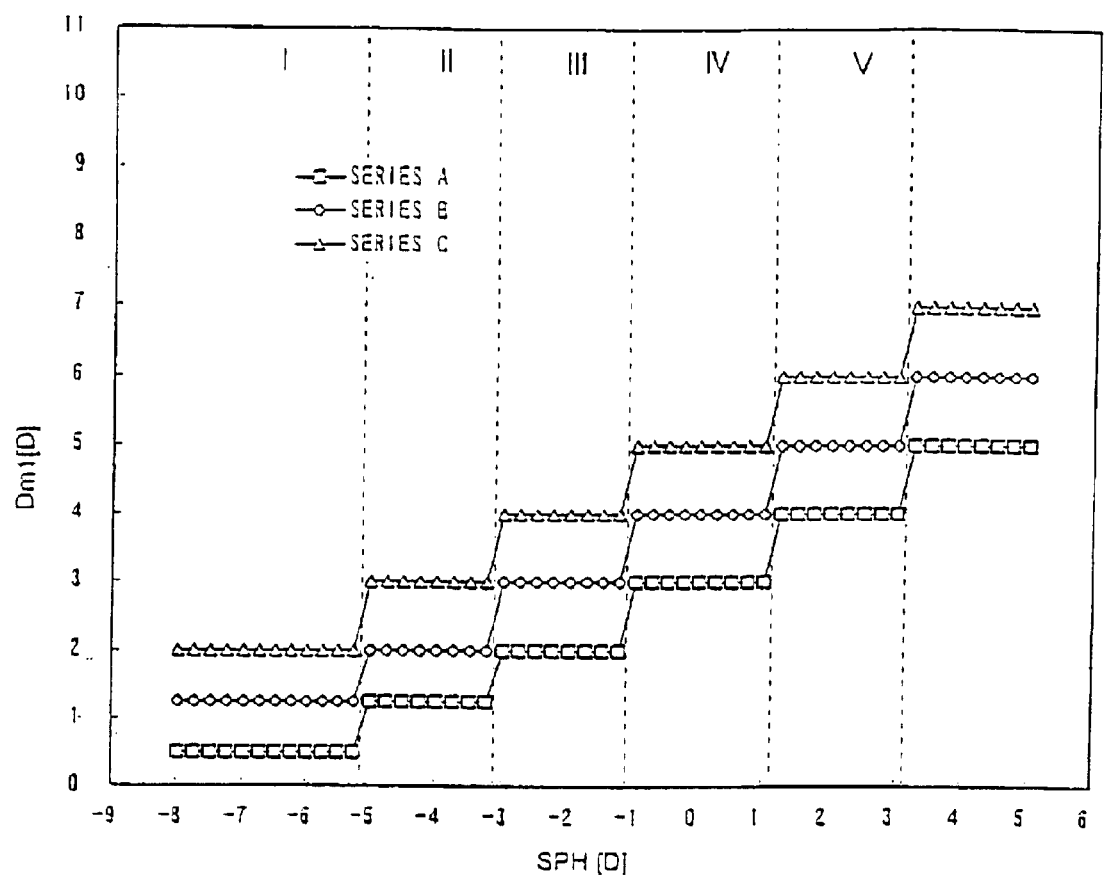
FIG. 19 is a graph showing variations of base curves of three series of the semifinished lens blanks according to a third embodiment.

For instance, FIG. 17 shows graphs of the back surface powers D2m(h) of the finished lenses (SPH −4.00 D, CYL −2.00 D, AX 180°) made from four series of semifinished lens blanks of the second embodiment at 0°, 30°, 60° and 90° of the azimuth angle θ. Further, FIG. 18 shows graphs of variation of back surface powers ΔD2m(h) of the finished lenses at 0°, 30°, 60° and 90° of the azimuth angle θ. In any cross-sections, $\Delta D2m(15)_i > \Delta D2m(15)_j$ holds for $D1m(0)_i < D1m(0)_j$.

Third Embodiment

In a third embodiment, a refractive index of the lens material is 1.67, a diameter of the finished lens is Φ70 mm, the minimum thickness is 1.0 mm, the front surface is a rotationally-symmetrical aspherical surface and the back surface is a rotationally-symmetrical aspherical surface or an atoroidal surface. Further, the entire range of the available vertex power of a spectacle lens is divided into six sections I through VI as shown in FIGS. 20A, 20B and 20C. FIG. 20A shows a range of minus diopter, FIG. 20B shows a range of plus diopter and FIG. 20C shows a range of mixed diopter. Three types of semifinished lens blanks (series A, B and C) that are different in base curve are prepared for each section. Therefore, eighteen types of semifinished lens blanks are prepared. The following TABLE 3 shows numerical values of the base curve of the semifinished lens blanks of the series A, B and C.

TABLE 3

| Section | Base Curve (unit: D) | | |
|---|---|---|---|
| | Series A | Series B | Series C |
| I | 0.50 | 1.25 | 2.00 |
| II | 1.25 | 2.00 | 3.00 |
| III | 2.00 | 3.00 | 4.00 |
| IV | 3.00 | 4.00 | 5.00 |
| V | 4.00 | 5.00 | 6.00 |
| VI | 5.00 | 6.00 | 7.00 |

The aspherical base curves of the series A, B and C are assigned to the front surfaces, and the shapes of the back surfaces are determined so as to have the most: suitable optical performance with the combination of the shapes of the front surfaces.

Figure 21:
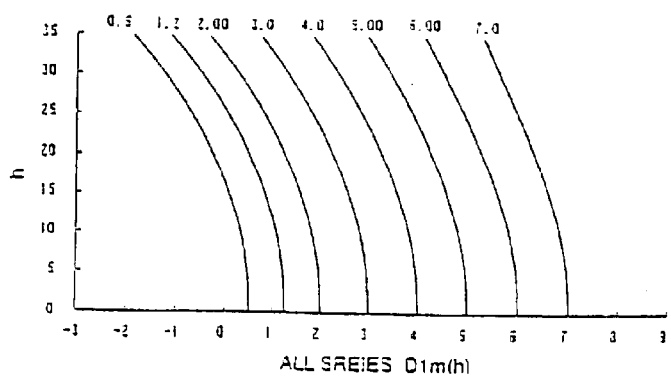
FIG. 21 is a graph showing front surface powers D1m(h) of the semifinished lens blanks of the third embodiment in cross-section containing the optical axis.

FIG. 21 shows graphs of front surface powers D1m(h) of the semifinished lens blanks in cross-section containing the optical axis. In the third embodiment, the common aspherical surfaces are employed for the front surface having the same base curve. For example, the aspherical front surfaces of the series A in the section III, the series B in the section II and the series C in the section I are identical. In the first embodiment, the aspherical front surface of the, specific series is different from that of other series even when the base curve is identical. On the contrary, in the third embodiment, the aspherical surface of the specific series is identical to that of the other series when the base curve is identical. Therefore, the values of the base curves are used as labels in the graph of FIG. 21.

Figure 22:
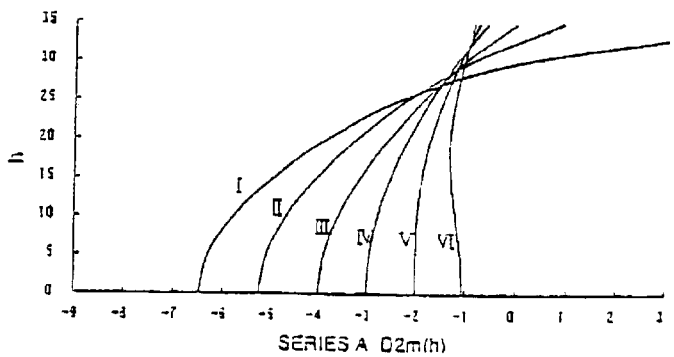
FIG. 22 shows graphs of back surface powers D2m(h) of the finished lenses made from three series of the semifinished lens blanks of the third embodiment.
Figure 22:
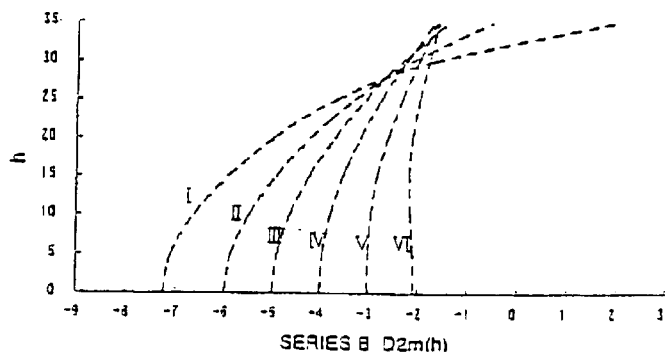
Figure 22:
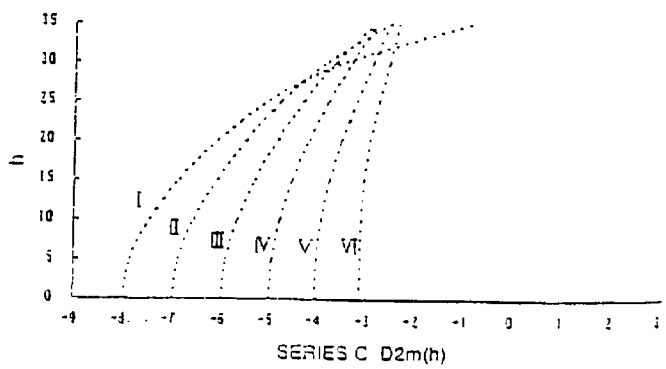

FIG. 22 shows graphs of back surface powers D2m(h) of the finished lenses made from three series of the semifinished lens blanks in the cross-section containing the optical axis. Each graph shows D2m(h) of the finished lenses of the six sections of the specific series. There are finished lenses whose vertex powers are SPH −6.00 in the section I, SPH −4.00 in the section II, SPH −2.00 in the section III, SPH 0.00 in the section IV, SPH +2.00 in the section V and SPH +4.00 in the section VI.

Figure 23:
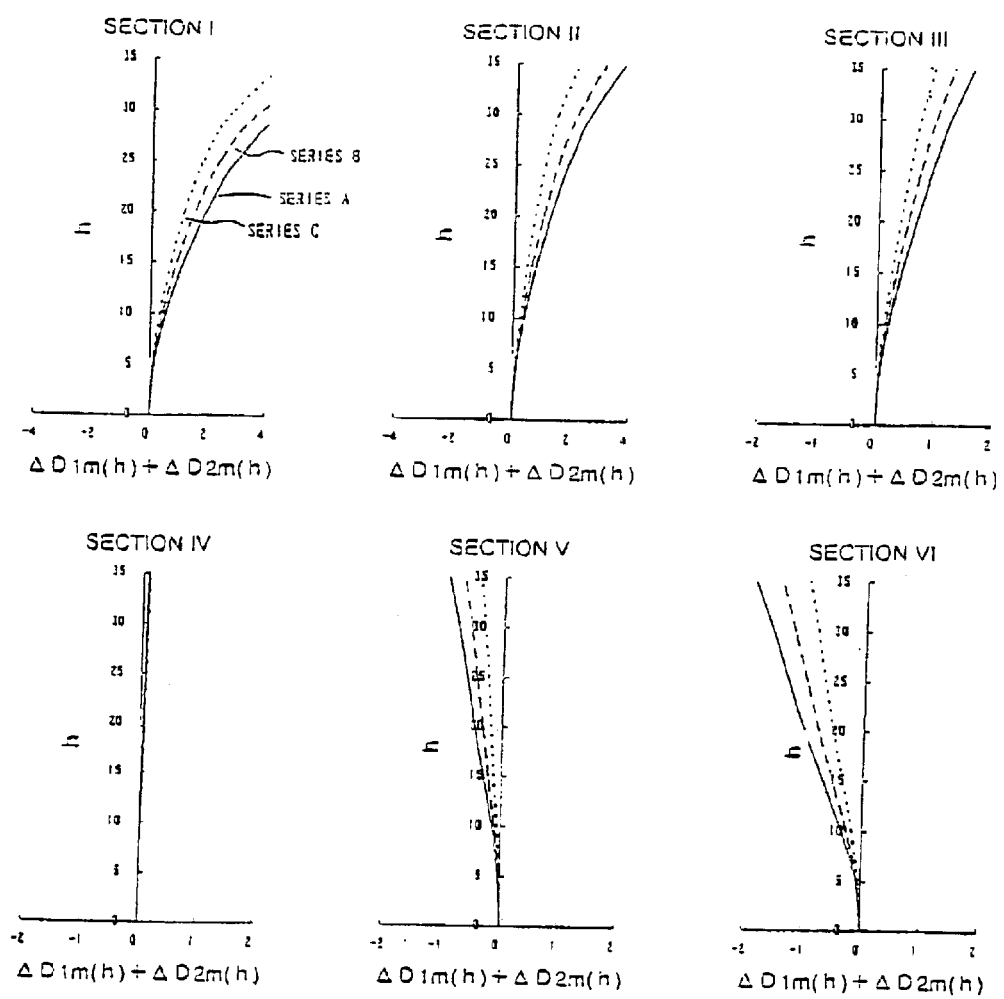
FIG. 23 shows graphs of the sum of the variations of front and back surface powers ΔD1m(h)+ΔD2m(h)

Further, FIG. 23 shows graphs of the sum of the variations of front and back surface powers $\Delta D1m(h)+\Delta D2m(h)$. With reference to FIG. 23, $\Delta D1m(15)_i + \Delta D2m(15)_i > \Delta D1m(15)_j + \Delta D2m(15)_j$ holds for $D1m(0)_i < D1m(0)_j$ in the minus lens (sections I, II and III), $\Delta D1m(15)_i + \Delta D2m(15)_i < \Delta D1m(15)_j + \Delta D2m(15)_j$ holds for $D1m(0)_i < D1m(0)_j$ in the plus lens (sections V and VI). That is, the conditions (1) and (2) are satisfied in either case.

Figure 24:
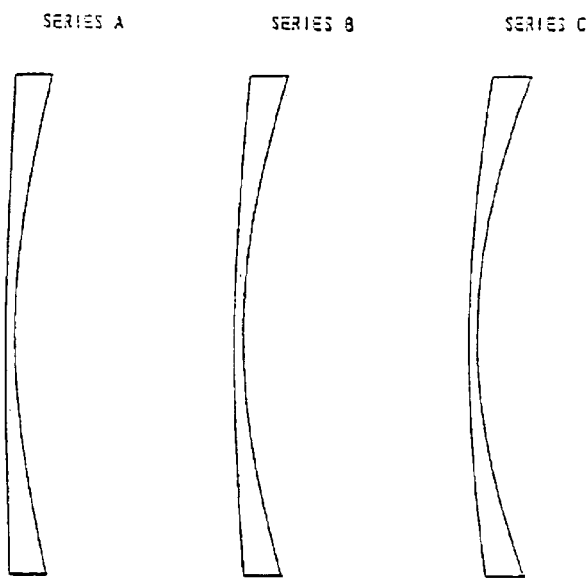
FIG. 24 shows cross-sections of the finished lenses (SPH −4.00 D) made from the three series of semifinished lens blanks of the third embodiment.

FIG. 24 shows cross-sections of the finished lenses (SPH −4.00 D) made from the semifinished lens blanks of the series A, B and C in the section II. The shapes of the finished lenses are different to one another. The slower the base curve is, the thinner the edge thickness is and the shorter the jutting amount of the front surface is. The finished lens made form the semifinished lens blank of the series A is the lightest in weight. The lens made from the series B is heavier than the series A, and the lens made from the series C is heavier than the series B.

Figure 25:
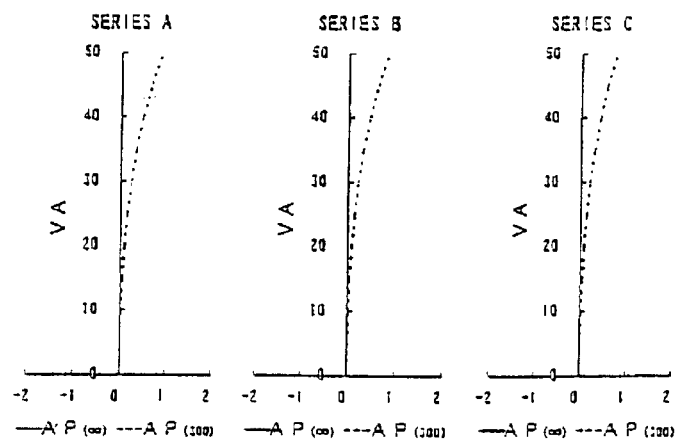
FIG. 25 shows graphs of average power errors AP of the finished lenses of FIG. 24.
Figure 26:
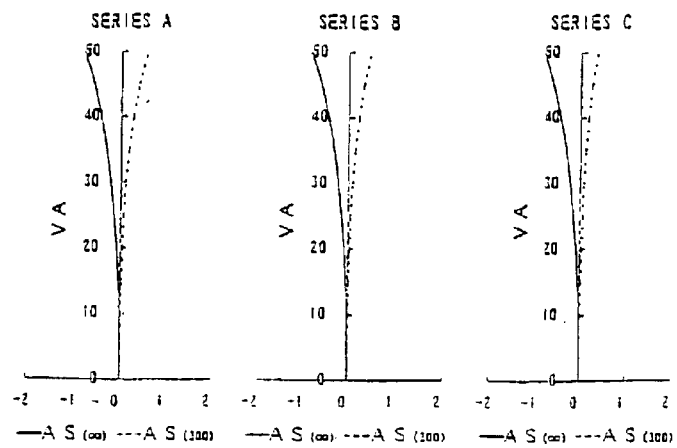
FIG. 26 shows graphs of astigmatisms AS of the finished lenses of FIG. 24.
Figure 28:
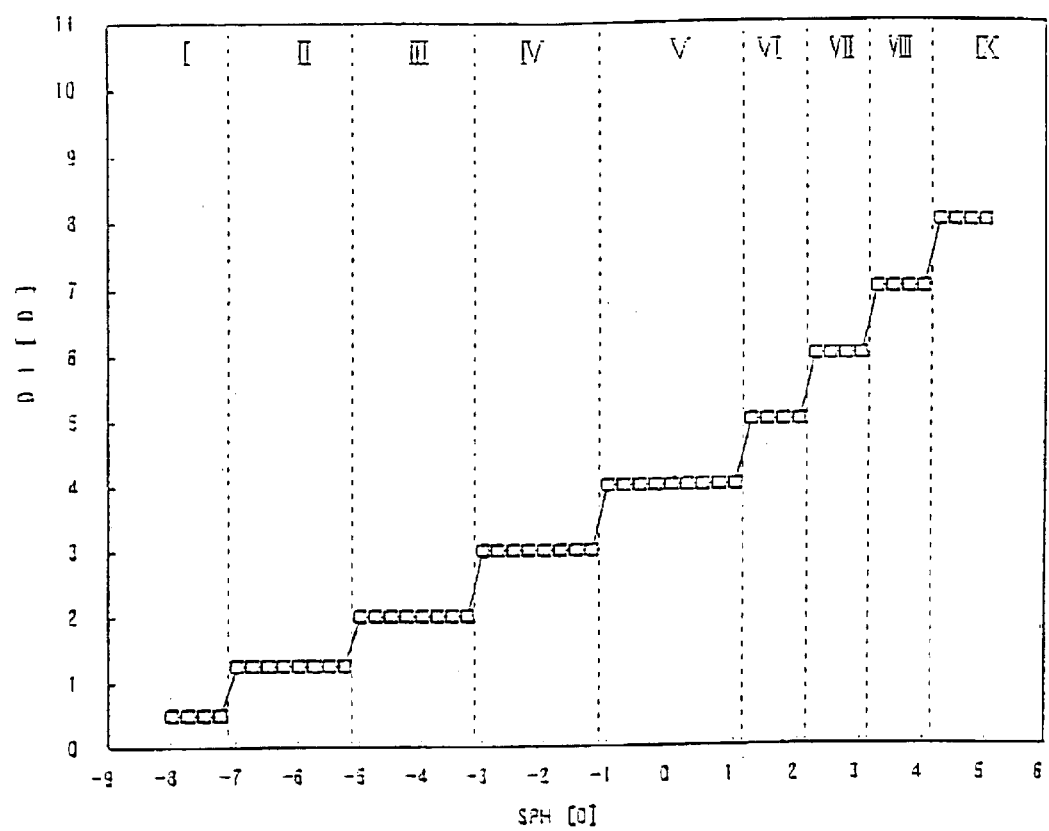
FIG. 28 is a graph showing variation of base curve of the semifinished lens blanks according to the prior art.

Average power errors AP of these finished lenses with respect to the visual angle VA are shown by graphs in FIG. 25 and astigmatisms AS thereof are shown by graphs in FIG. 26. In each graph a solid line represents the aberration for distance vision (object distance: ∞) and a dotted line represents the aberration for near vision (object distance: 300 mm).

In the third embodiment, since the sum of the variations of the front and back surface powers $\Delta D1m(h)+\Delta D2m(h)$ are different according to the series as shown in FIG. 23, the optical performance (the average power error and the astigmatism) of the finished lens becomes substantially constant when the finished lens is made from any one of the semifinished lens blanks of the series A, B and C. For the vertex power SPH −4.00 both of the differences of the average power errors AP and the differences of the astigmatisms AS are not greater than 0.05 diopter within 30 degrees of visual angle as shown in FIGS. 25 and 26. That is, the optical performances are approximately identical in spite of the difference in the series.

On the other hand, distortions at 50 degrees of visual angle are −23.8% in the series A, −22.5% in the series B and −21.0% in the series C. The distortion decreases as the base curve becomes sharper. Further, sensitivities $\Delta AP(30°)/\Delta Y$ of the variation of the average power error at 30 degrees of visual angle with respect to the lens deviation in the upward direction are −0.076 D/mm in the series A, −0.068 D/mm in the series B and −0.058 D/mm in the series C. Still further, sensitivities $\Delta AS(30°)/\Delta Y$ of the variation of the astigmatism at 30 degrees of visual angle with respect to the lens deviation in upward direction are −0.083 D/mm in the series A, −0.074 D/mm in the series B and −0.064 D/mm in the series C. The sensitivity decreases as the base curve becomes sharper.

A finished lens whose both of front and back surfaces are spherical or toric may be included in any one series For example, since the variations of the surface powers of the finished lenses of the series A–D in the section V in the first embodiment are relatively small, it is unnecessary to employ the aspherical surfaces to keep the optical performance, which allows to employ the finished lenses whose both of front and back surfaces are spherical or toric. In the same manner, since the base curves of the finished lenses of the series C and D in the any sections are relatively sharp, the required optical performance can be achieved without employing aspherical surfaces, which allows to employ the finished lenses whose both of front and back surfaces are spherical or toric.

In the above embodiments, the most suitable semifinished lens blank is selected according to a customer's order among the prepared semifinished lens blanks. However, a plurality of finished lens that are different in the base curve may be prepared for vertex powers that are frequently ordered. In such a case, the lens maker can supply the most suitable lens by selecting from among the stock piled finished lenses. This kind of supplying method is included in the scope of the invention.

The present disclosure relates to the subject matters contained in Japanese Patent Applications No. 2000-203590, filed on Jul. 5, 2000 which is expressly incorporated herein by reference in its entirety.

What is claimed is:

1. A manufacturing method of a spectacle lens at least one of whose front and back surfaces is aspherical, comprising:
   preparing a plurality of types of semifinished lens blanks that are different in base curve for each of predetermined vertex powers;
   selecting one type of said semifinished lens blank among said plurality of types of said semifinished lens blanks that are prepared for the same vertex power based on considerations of optical performance and outward appearance; and processing a back surface of the selected semifinished lens blank to form a finished lens according to a required specification for the spectacle lens.

2. The manufacturing method according to claim 1, wherein three or more types of the semifinished lens blanks are prepared for each of said predetermined vertex powers.

3. The manufacturing method according to claim 1, wherein any pair of said finished lenses, which are made from said semifinished lens blanks prepared for the same vertex power, satisfy the following condition (1) when SPH <0, CYL≦0 and satisfy the condition (2) when SPH>0, CYL≧0:

(1) $\Delta D1m(15)_i + \Delta D2m(15)_i > \Delta D1m(15)_j + \Delta D2m(15)_j$ (2) $\Delta D1m(15)_i + \Delta D2m(15)_i < \Delta D1m(15)_j + \Delta D2m(15)_j$ where
SHP is a spherical power (unit: diopter),
CYL is a cylindrical power (unit: diopter),
D1m(h) and D2m(h) are surface powers of the front and back surfaces (unit: diopter) at the point whose distance from the optical axis of said finished lens is h (unit: mm) in a plane that contains said optical axis,
$\Delta D1m(h)$ is a variation of surface power of the front surface and is obtained by D1m(h)–D1m(0),
$\Delta D2m(h)$ is a variation of surface power of the back surface and is obtained by D2m(h)–D2m(0), and
the subscript "i" represents the values of the finished lens that has smaller base curve and the subscript "j" represents the values of the finished lens that has larger baser curve as described by $D1m(0)_i < D1m(0)_j$.

4. The manufacturing method according to claim 1, wherein the front surface of said finished lens is a rotationally-symmetrical aspherical surface and the back surface is selected from among a spherical surface and a toric surface.

5. The manufacturing method according to claim 1, wherein the front surface of said finished lens is selected from among a spherical surface and a toric surface and the back surface is a rotationally-symmetrical aspherical surface.

6. The manufacturing method according to claim 1, wherein both of the front and back surfaces of said finished lens are aspherical surfaces.

7. The manufacturing method according to claim 1, wherein average power errors and astigmatisms of said finished lenses, which are made from said semifinished lens blanks having different base curves prepared for the same vertex power, are approximately identical within 30 degrees of visual angle.

8. The manufacturing method according to claim 1, wherein differences of average power errors and differences of astigmatisms among said finished lenses, which are made from said semifinished lens blanks having different base curves prepared for the same vertex power, are not greater than 0.1 diopter within 30 degrees of visual angle.

9. The manufacturing method according to claim 1, wherein one type of said semifinished lens blanks prepared for one vertex power has an approximately identical base curve with one type of said semifinished lens blanks prepared for another vertex power.

10. The manufacturing method according to claim 1, wherein differences of base curves between one type of said semifinished lens blanks prepared for one vertex power and one type of semifinished lens blanks prepared for ether another vertex power is not greater than 0.2 diopter.

11. A manufacturing method of a spectacle lens whose at least one of whose front and back surfaces is aspherical, comprising:

dividing the entire range of available vertex power of a spectacle lens into a plurality of sections; preparing a plurality of types of semifinished lens blanks that are different in base curve for each of said sections;

determining one of said sections according to a required specification of the spectacle lens;

selecting one type of said semifinished lens blank among said plurality of types of said semifinished lens blanks that are prepared for the same sections based on considerations of optical performance and of outward appearance; and processing a back surface of the selected semifinished lens blank to form a finished lens according to a required specification for the spectacle lens.

12. A supplying method of a spectacle lens whose at least one of whose front and back surfaces is aspherical, comprising:

preparing a plurality of types of finished lenses that are different in base curve for the same vertex power, average power errors and astigmatisms of said finished lenses being approximately identical within 30 degrees of visual angle; and selecting one type of said finished lenses among said plurality of types of said finished lenses based on consideration of optical performance and of outward appearance and a required specification for the spectacle lens.

13. A method for manufacturing a spectacle lens, at least one of a back surface and a front surface of the spectacle lens being aspherical, the manufacturing method comprising:

preparing a plurality of types of semifinished lens blanks for each of a plurality of predetermined vertex powers, each of the plurality of types of semifinished lens blanks having a different base curve;

selecting one type of semifinished lens blanks from among said plurality of types of said semifinished lens blanks that have the same vertex power based on considerations of optical performance and aesthetics; and processing a back surface of the selected semifinished lens blank to form a finished lens according to a required specification for the spectacle lens.

* * * * *